UNITED STATES PATENT OFFICE.

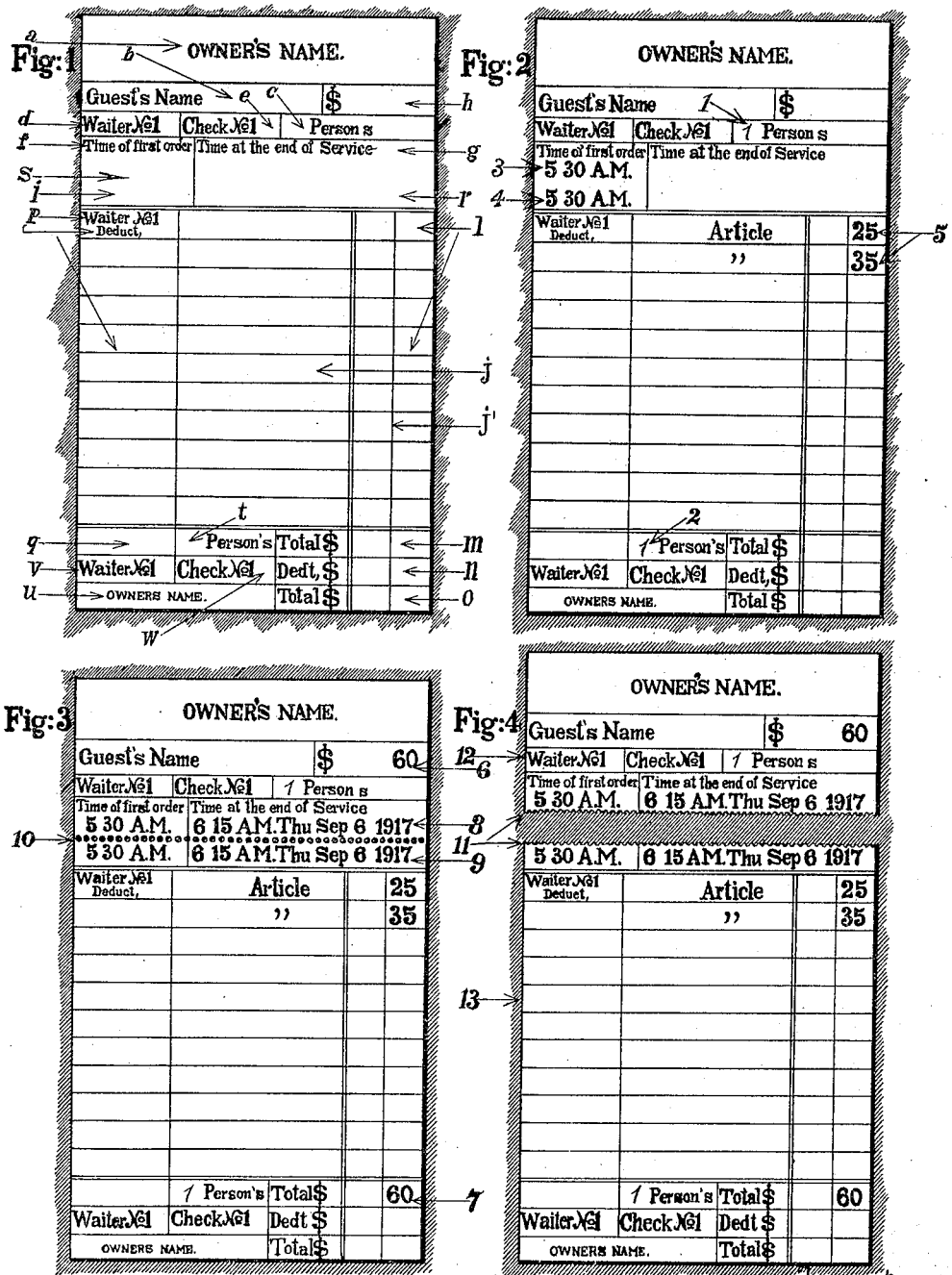

AUGUST N. E. BOOS, OF NEW YORK, N. Y.

DATE AND TIME SERVICE PROTECTIVE-PERFORATION RECORDING CHECK AND RECEIPT.

1,330,368. Specification of Letters Patent. Patented Feb. 10, 1920.

Application filed September 19, 1917, Serial No. 192,059. Renewed June 25, 1919. Serial No. 306,714.

*To all whom it may concern:*

Be it known that I, AUGUST N. E. BOOS, a citizen of the German Empire, and a resident of the borough of Manhattan, in the county, city, and State of New York, have invented certain new and useful Improvements in Date and Time Service Protective-Perforation Recording Checks and Receipts, of which the following is a specification.

The present invention relates to improvements in date and time service protective perforation recording checks and receipts, and particularly to such checks and receipts for use in restaurants or other businesses where there is opportunity for fraud, mistakes, overcharges, and the like. The present check is designed with a view to keeping an accurate record of the services rendered, and the time of such service, in such a manner as to protect the guest and the proprietor against any surreptitious practices which have been possible with the usual form of checks.

Another object is to provide such a check which will enable changes and deductions to be conveniently made, and which will provide for both the proprietor and the guest a complete and accurate record of the transaction, such record including the number of the waiter and the check. A further object is to provide for a protective perforation being made in the check after completion of the service, by an authorized person who before giving the receipt to the guest checks up the entries thereon. A further object is to provide such a check which is an improvement of, and possesses certain novel features and advantages over the form of check disclosed in my co-pending application Serial No. 34,784, filed June 18th, 1915.

With these and other objects in view, an embodiment of my invention is shown in the accompanying drawings, and this embodiment will be hereinafter more fully described with reference to the accompanying drawings, and the invention will be finally pointed out in the claims.

In the accompanying drawings;

Figure 1 is a plan view of my improved check ready for use and without entries thereon;

Fig. 2 is a similar view showing entries thereon, and the time of beginning the service;

Fig. 3 shows the same at the completion of the service, with the total and time of completion stamped thereon, and a line of perforations made therein to enable the guest's receipt portion to be separated therefrom; and Fig. 4 shows the receipt portion separated.

Similar reference characters indicate corresponding parts throughout the several figures of the drawings.

Referring to the drawings, and more particularly to Fig. 1 thereof, my improved check comprises a rectangular shaped piece of paper, cardboard or the like, such as is usually used for such checks, which at the beginning of the service is unperforated, and without folds, creases or other weakening devices, that is, the check is solid, flat and unbroken in form. The portions of the check indicated above the area or line of severance $s$ constitutes the guest's receipt portion, while the portion below constitutes the main body portion to be retained by the proprietor.

At the extreme upper portion of the check and within the guest's receipt portion, there is provided space $a$ designated in the illustrated embodiment "Owner's name." In actual practice, of course, this will contain the name of the establishment using the check.

Below the space $a$ there is provided a transverse portion divided into two spaces $b$ and $h$, and at the left hand portion of these spaces there are printed respectively the words "Guest's name" and the symbol "$". Sufficient space is left at the right of these designations to receive the guest's name and the total amount of the order.

Another transverse portion is provided below the spaces $a$ and $b$ which is divided into three spaces $d$, $e$ and $c$. The space $d$ contains the words "Waiter No. 1", or other suitable designation to indicate the number, letter or other identifying character of the waiter, it being understood that in most restaurants, waiters are so distinguished. In the case of the check being used in a store, this space will contain the designating character of the clerk or salesman using the same. The space $e$ contains the words "Check No. 1". The checks are preferably provided in a stack or pad, and the numbers vary consecutively. The space $c$ contains the word "Persons", and sufficient space is provided in front of the same to receive the number of persons waited upon.

At the lower portion of the guest's receipt portion, and at the upper portion of the main body portion there is provided a relatively wide transverse portion extending above and below the area or line $s$ divided into two spaces $i$ and $r$, the space $i$ being smaller than the space $r$. At the upper portion of the space $i$ and within the guest's receipt portion there are provided as at $f$ the words "Time of first order", and in a similar portion within the space $r$ there are provided as at $g$ the words "Time at the end of service".

The line or area of severance $s$ is substantially centrally of the space below the designations $f$ and $g$, so that adjacent spaces of substantially equal size are provided both in the guest's receipt and the main body portion for receiving time markings, as hereinafter more fully pointed out.

The main body portion of the check is provided intermediate its ends with a plurality of transversely ruled lines, divided into three vertically disposed spaces $p$, $j$ and $l$, the spaces $j$ and $l$ being separated by a double line. The space $p$ is provided at its upper end with the words "Waiter No. 1," and "Deduct," the space $p$ being for the entry of amounts to be deducted from the order, such deductions being occasioned in case of returns, changes, overcharges or the like. The space $j$ is for the entry of the items ordered, the charge for the items being placed at the right hand side of the check in the space $l$, a line $j'$ being provided to separate the dollars and cents.

The lower portion of the main body is separated from the portions $p$, $j$ and $l$ by a double line, and is divided into three transverse portions, the upper of which is divided into spaces $q$, $t$ and $m$. The space $q$ is disposed beneath the space $p$ and is adapted to receive the total amount of the deductions. The space $t$ has the word "Persons" printed therein and a space is provided in front to receive the number of persons served, this being the proprietor's record. The space $m$ contains the word "Total" and the symbol "$", and at the right sufficient space is provided to receive the total amount of the order, this being directly beneath the individual charges of the items.

The intermediate portion is likewise divided into three spaces $v$, $w$ and $n$, the space $v$ containing the words "Waiter No. 1," the space $w$ containing the words "Check No. 1," and the space $n$ containing the abbreviation "Ded't" and the symbol "$". The space $n$ it will be noted, is immediately beneath the space $m$ and is adapted to receive the total deduction, which may then be subtracted from the total in the space $m$, the remainder being placed in the space $o$ of the lower portion, in which there is printed the word "Total" and the symbol "$". The remaining space $u$ of the lower portion has the owner's name printed therein.

In use, the guest's name may be placed in the space $b$, that is the guest paying the check, and the number of persons is placed in the spaces $c$ and $t$, as at 1 and 2. The order is taken, the items being placed in the space $j$, and the amounts at the right in the space $l$ as at 5, and thereupon the time of the first order, or the beginning of the service is placed in duplicate as at 3 and 4, in the space $i$ respectively above and below the imaginary line indicated by $s$, (Fig. 1) so that there is a time entry in both the receipt and body portion. Should there be any deductions, changes or the like, these are placed in the space $p$. When the service is completed, the total is placed in the space $m$ as at 7, and if there are any deductions, the total is placed both in spaces $q$ and the space $n$, and after subtracting, the corrected total is placed in the space $o$, and also in the space $h$ of the receipt portion, as at 6. When the check is paid, the cashier or other person of authority stamps the time of completion of the service, including the date, in duplicate, as at 8 and 9, in the space $r$, one entry above the line $s$, in the receipt portion, and one being below the line $s$ in the body portion. Thereupon, or simultaneously with the time entry the line or area of severance $s$ is perforated as at 10. The receipt may then be severed from the main body portion, and handed to the guest. It will be noted that the check remains as a solid inseparable body and receipt portion when the same is actually paid, and the receipt can only be made separable by the cashier or other person designated to perform this function.

The guest's receipt portion shows the guest that he has paid his bill, and is a record of the place, time and date of the meal, the number of persons fed and the price paid for the meal. The body portion is a complete record for the restaurant. With my improved check any possibility of fraud or mistake is entirely obviated, and the business may be conducted with speed, accuracy and efficiency.

I have illustrated a preferred and satisfactory embodiment of my invention, but it is obvious that changes may be made therein, within the spirit and scope thereof, as defined in the appended claims.

I claim:

1. A service check for restaurants and the like, comprising a ticket and a coupon, the coupon bearing printed matter constituting the guest's receipt portion, and the ticket bearing printed matter constituting a waiter's check, the adjacent portions of the ticket and coupon being provided with spaces extending to both side extremities of said check and means within said spaces appropriately designating said spaces to receive duplicating marks, one above the other indicating the time of beginning and completing a certain service, the adjacent portions of said ticket and coupon permitting the simultaneous entry of said duplicate marks, the said spaces extending to both side extremities providing laterally clear areas for the entry of said duplicate marks, a check number, and a waiter's number in lateral alinement on the guest's receipt portion above said adjacent portions of said ticket and coupon, and on said waiter's check portion respectively, spaces for the entry of items on the waiter's check portion, and spaces appropriately designated for the entry of the total on said guest's receipt portion and waiter's check portion respectively.

2. A service check for restaurants and the like, comprising a ticket and a coupon, the coupon bearing printed matter constituting the guest's receipt portion, and the ticket bearing printed matter constituting a waiter's check, the adjacent portions of the ticket and coupon being provided with spaces extending to both side extremities, and means within said spaces appropriately designating said spaces to receive duplicate marks, one above the other indicating the time of beginning and completing a certain service, the adjacent portions of said ticket and coupon permitting the simultaneous entry of said duplicate marks, the said spaces extending to both side extremities, providing laterally clear areas for the entry of said duplicate marks, a check number, and a waiter's number in lateral alinement on the guest's receipt portion above said adjacent portions of said ticket and coupon, and on said waiter's check portion respectively, spaces for the entry of items on the waiter's check portion, and spaces appropriately designated for the entry of the total on said guest's receipt portion and waiter's check portion respectively, said ticket and coupon being separable by means of a line of perforations disposed between said spaces adapted to receive duplicate marks.

3. A service check for restaurants and the like, comprising a ticket and a coupon, the coupon bearing printed matter constituting the guest's receipt portion, and the ticket bearing printed matter constituting a waiter's check, the adjacent portions of the ticket and coupon being provided with spaces extending to both side extremities, and means within said spaces appropriately designating said spaces to receive duplicate marks, one above the other indicating the time of beginning and completing a certain service, the adjacent portions of said ticket and coupon permitting the simultaneous entry of said duplicate marks, the said spaces extending to both side extremities, providing laterally clear areas for the entry of said duplicate marks, a check number, and a waiter's number in lateral alinement on the guest's receipt portion above said adjacent portions of said ticket and coupon, and on said waiter's check portion respectively, spaces for the entry of items on the waiter's check portion, and spaces appropriately designated for the entry of the total on said guest's receipt portion and waiter's check portion respectively, said ticket and coupon adapted after the entry of said duplicate time marks to be made separable by means of a line of perforations, disposed between said spaces adapted to receive said duplicate marks.

In testimony that I claim the foregoing as my invention, I have signed my name.

AUGUST N. E. BOOS.